(12) United States Patent
Hashimoto et al.

(10) Patent No.: US 7,837,972 B2
(45) Date of Patent: Nov. 23, 2010

(54) PRODUCTION METHOD OF BARIUM TITANATE

(75) Inventors: Shinsuke Hashimoto, Nikaho (JP); Tomoaki Nonaka, Nikaho (JP); Hiroshi Sasaki, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 12/289,376

(22) Filed: Oct. 27, 2008

(65) Prior Publication Data

US 2009/0117029 A1  May 7, 2009

(30) Foreign Application Priority Data

Nov. 7, 2007 (JP) .............................. 2007-289944

(51) Int. Cl.
*C01F 11/02* (2006.01)

(52) U.S. Cl. .............................. 423/594.16; 423/594.1; 423/598

(58) Field of Classification Search ............ 423/594.16, 423/598, 593.1, 594.1
See application file for complete search history.

(56) References Cited

U.S. PATENT DOCUMENTS

| 6,485,701 | B2 * | 11/2002 | Miyoshi .................. 423/594.9 |
| 2003/0012727 | A1 * | 1/2003 | Yoshikawa et al. .......... 423/598 |
| 2004/0071629 | A1 * | 4/2004 | Nakaya et al. .............. 423/598 |

FOREIGN PATENT DOCUMENTS

| JP | A-10-338524 | 12/1998 |
| JP | B2-3295018 | 4/2002 |
| JP | 2005-008471 A1 * | 1/2005 |
| JP | A-2005-8471 | 1/2005 |
| JP | A-2006-306632 | 11/2006 |

OTHER PUBLICATIONS

Bologna, A. et al.; "Dielectric Properties and Aging of Fast-Fired Barium Titanate". Latin American Applied Research. 35:29-45 (2005).*

* cited by examiner

*Primary Examiner*—Stuart Hendrickson
*Assistant Examiner*—Richard M Rump
(74) *Attorney, Agent, or Firm*—Oliff & Berridge, PLC

(57) ABSTRACT

A production method of barium titanate according to the present invention comprises steps of preparing powder mixture of barium carbonate powder and titanium oxide powder and firing the powder mixture. The temperature of the powder mixture is raised to firing temperature at 100° C./minute or more in the range of 400° C. to 700° C.; and maximum temperature at firing is 700° C. or more. The present invention aims at providing a production method, wherein grain growth of barium carbonate particle can be controlled in temperature rising process when producing barium titanate by a solid phase reaction of barium carbonate and titanium oxide; and homogeneous barium titanate powder with small particle size can be produced with excellent energy efficiency.

4 Claims, No Drawings

PRODUCTION METHOD OF BARIUM TITANATE

BACKGROUND OF THE INVENTION

1. Field of the Invention

The present invention relates to a production method of barium titanate powder used for forming a dielectric layer of a ceramic capacitor.

2. Description of the Related Art

As a dielectric layer of a ceramic capacitor, barium titanate ($BaTiO_3$) is widely used. The dielectric layer is obtained by forming a green sheet from a paste containing barium titanate powder and sintering the green sheet. The barium titanate powder used in such an application is generally produced by a solid phase synthesis method. In the solid phase synthesis method, barium carbonate ($BaCO_3$) powder and titanium oxide ($TiO_2$) powder are wet mixed and dried; and then the powder mixture is fired at a temperature around 900 to 1200° C. to react barium carbonate particle and titanium oxide particle in a solid phase, so that the barium titanate powder is obtained.

Firing of the powder mixture of barium carbonate powder and titanium oxide powder is performed at the above firing temperature by raising temperature around normal temperature thereto. When firing of the powder mixture of barium carbonate particle and titanium oxide particle, generation of barium titanate starts approximately at 550° C. On the other hand, barium carbonate which is a raw material is known to show grain growth around 400 to 800° C. Therefore, the temperature rising process of the powder mixture results in grain growth of barium carbonate particle. Reaction at a predetermined firing temperature thereafter consequently causes to produce barium titanate powder with large particle size since barium carbonate particle of increased particle size is reacted with titanium oxide particle. In addition, the powder mixture used in the solid phase method is not always homogeneous in dispersion of barium carbonate particle and titanium oxide particle. Concentrations of barium carbonate particle are therefore varied in the powder mixture. In a portion with high concentration of barium carbonate particle, grain growth of barium carbonate particle is increased to produce large barium carbonate particle, but in a portion with low concentration of barium carbonate particle, grain growth of barium carbonate particle hardly occurs. As a result, particle sizes of barium carbonate particles are nonuniform, and particle sizes of the obtained barium titanate powder are varied. Further, a part of heat energy in the temperature rising process is used for grain growth of barium carbonate particle, resulting in a problem on energy efficiency.

Recently, it is required to downsize a capacitor, but a paste including barium titanate powder with large particle size prevents making dielectric layer thinner. Therefore, for making a dielectric layer thinner, the above-obtained barium titanate powder is subject to pulverization to produce powder having a desired particle size. However, pulverization is a time-consuming, expensive process, which makes powder properties of the obtained powder inhomogeneous. Further, when producing a capacitor by using barium titanate powder having greatly-varied particle size and nonuniform powder properties, electrical characteristic of the capacitor will be unstable. Therefore, a simple method to obtain homogeneous barium titanate powder having small particle size is required.

By suppressing grain growth of barium carbonate particle in the temperature rising process of the powder mixture, it may be possible to make the resulting barium titanate powder finer and to uniformize particle size thereof. The Japanese Unexamined Patent Publication 10-338524A discloses a production method of barium titanate powder to prepare powder mixture by mixing barium carbonate powder with relatively large particle size and titanium oxide powder with small particle size followed by firing process for suppressing grain growth of barium carbonate particle. Specifically, barium carbonate powder with specific surface area of 10 $m^2$/g or less and titanium oxide powder with specific surface area of 15 $m^2$/g or more are used. By this method, barium carbonate particle with large particle size is surrounded by titanium oxide particle with small particle size, so that the barium carbonate particles can be inhibited contacting each other, resulting in suppressing grain growth of the barium carbonate powder.

However, since the barium carbonate powder with relatively large particle size is used as a material powder, miniaturization of the barium titanate powder is limited. Also, in case of using powder with large particle size, reaction proceeds slowly, so that firing for long time or at high temperature is required for obtaining homogeneous barium titanate, causing a problem in energy efficiency.

Therefore, if it is possible to suppress grain growth of barium carbonate particle when using fine material powder, homogeneous barium titanate powder with small particle size may be obtained with excellent energy efficiency.

The Japanese Unexamined Patent Publication 2005-8471A discloses setting a temperature rising rate up to a firing temperature at 30° C./min or more for suppressing generation of hetero-phase in production of Ca-modified barium titanate (($Ba_{1-x}Ca_x$)$TiO_3$) powder. The temperature rising rate is specifically 30° C./min or 60° C./min in the Japanese Unexamined Patent Publication 2005-8471A.

SUMMARY OF THE INVENTION

As mentioned above, barium carbonate powder with relatively large particle size is used as a material powder in the Japanese Unexamined Patent Publication 10-338524A, and therefore, miniaturization of the barium titanate powder is limited. Also, in case of using powder with large particle size, reaction proceeds slowly, so that firing for long time or at high temperature is required for obtaining homogeneous barium titanate, causing a problem in energy efficiency.

The present invention is achieved in view of the above prior arts, and has a purpose to provide a production method of barium titanate, capable of suppressing grain growth of barium carbonate particle in a temperature rising process and producible of homogeneous barium titanate powder having small particle size with excellent energy efficiency.

The present invention for solving above problems includes the following features as the subject-matters:

(1) A production method of barium titanate comprising steps of preparing powder mixture of barium carbonate powder and titanium oxide powder, and firing the powder mixture, wherein temperature of the powder mixture is raised to a firing temperature at a temperature rising rate of 100° C./min or more in the range of 400° C. to 700° C.; and maximum temperature at firing is 700° C. or more.

(2) The production method of barium titanate as set forth in (1), wherein Ba/Ti (molar ratio) in the powder mixture is 1.000 or more.

(3) The production method of barium titanate as set forth in (1) or (2), wherein a specific surface area of the titanium oxide powder is 15 to 100 $m^2$/g and a specific surface area of the barium carbonate powder is 10 to 50 $m^2$/g.

According to the present invention, grain growth of barium carbonate particle can be suppressed in a temperature rising process, and homogeneous barium titanate powder can be obtained with excellent energy efficiency. Particularly, when using powder mixtures with a large ratio of barium carbonate powder as a material powder, grain growth of barium carbonate particle can be prevented, so that it is possible to obtain homogeneous barium titanate with any composition (Ba/Ti ratio). Further, by using barium carbonate powder and titanium oxide powder with small particle sizes as a material powder, barium titanate powder, with small particle size and uniform particle properties, can be obtained. Therefore, according to the present invention, time and cost for pulverization after firing can be reduced. Further, since grain growth of the fine powder of barium titanate may be induced by firing, it is possible to easily obtain barium titanate powder with desired particle size by appropriately setting the firing time.

DESCRIPTION OF THE PREFERRED EMBODIMENTS

Hereinafter, the present invention will be described further in detail including the most preferred embodiments.

The production method of barium titanate of the present invention comprises steps of preparing powder mixture of barium carbonate powder and titanium oxide powder and firing the powder mixture.

The barium carbonate powder and titanium oxide powder used as raw materials are not particularly limited, and commonly-known barium carbonate powder and titanium oxide powder can be used. However, it is preferable to use material powder with relatively small particle size for stimulating solid phase reaction and obtaining fine barium titanate powder. Therefore, a specific surface area of the titanium oxide powder used as a raw material is preferably 15 to 100 $m^2/g$, further preferably 15 to 50 $m^2/g$ and particularly preferably 30 to 50 $m^2/g$, and a specific surface area of the barium carbonate powder is preferably 10 to 50 $m^2/g$, further preferably 10 to 40 $m^2/g$ and particularly preferably 20 to 40 $m^2/g$. Note that the specific surface area is measured by a BET method.

By using fine powder as a material powder, solid phase reaction can be accelerated. As a result, the firing temperature can be lowered, and firing time can be reduced, resulting in reduction of energy costs. Also, by using fine powder as a material powder, barium titanate powder with small particle size and uniform particle properties can be obtained. Since grain growth of the obtained fine powder of barium titanate is induced by firing, it is possible to easily obtain barium titanate powder with desired particle size by appropriately setting the firing time.

Also, when a ratio of barium carbonate powder and titanium oxide powder in the powder mixture is close to stoichiometric composition producible of barium titanate, there is no particular problem. Therefore, Ba/Ti (molar ratio) in the powder mixture may be 0.990 to 1.010. When Ba/Ti exceeds 1.010, unreacted barium carbonate may remain, and when it falls below 0.990, a hetero-phase including Ti may be generated.

However, the method of the present invention is particularly effective in production of barium titanate having Ba/Ti (molar ratio) of 1.000 or more and excess of Ba. When using barium titanate as a main component of a dielectric ceramic composition and adding a subcomponent thereto, the subcomponent may be dispersed into the barium titanate in a firing process for forming a dielectric layer, causing deterioration of dielectric property. However, by using barium titanate including excess of Ba, dispersion of the subcomponent can be properly suppressed by excess of Ba, and dielectric property may be less influenced by the firing temperature and the like, so that a dielectric ceramic having stable dielectric property can be obtained.

In order to obtain barium titanate including excess of Ba, it is necessary to increase a ratio of barium carbonate in the material powder. However, in a conventional production method, increase in a ratio of barium carbonate may cause increased contact frequency of barium carbonate powders in the powder mixture, and more grain growth of the barium carbonate in the temperature rising process. As a result, the particle size of the obtained barium titanate powder may be increased, and grain growth of the barium carbonate is energy-consuming, so that it is not preferable in view of energy efficiency.

However, according to the production method of the present invention, grain growth of the barium carbonate particle in the temperature rising process can be suppressed and homogeneous barium titanate powder can be obtained with excellent energy efficiency. Therefore, the production method of the present invention is particularly effective in obtaining barium titanate powder having large Ba ratio. Therefore, Ba/Ti (molar ratio) in the powder mixture used in the present invention is preferably 1.000 or more, further preferably 1.000 to 1.010 and particularly preferably 1.000 to 1.005.

A method of preparing powder mixture is not particularly limited, and common procedure such as wet mixing method using a ball mill may be employed. The obtained powder mixture is dried and then fired to obtain barium titanate powder.

In the present invention, temperature is raised at a temperature rising rate of 100° C./min or more, preferably 120° C./min or more and further preferably 150° C./min in the range of 400° C. to 700° C. in the temperature rising process to the firing temperature. The upper limit of the temperature rising rate is not particularly limited, but is preferably 200° C./min or lower from viewpoints of load to a heating device, etc.

An atmosphere in the temperature rising process is not particularly limited as well. The temperature rising process may be performed in air atmosphere or gas atmosphere such as nitrogen, or may be under reduced-pressure or in vacuum.

Such manipulation of temperature rising may be performed using an electric furnace provided with a heating element capable of high-speed temperature rising, for example. Also, the temperature rising may be performed by putting the above powder mixture in an electric furnace kept at 700° C. or more. Further, temperature rising may be performed by serially arranging multiple electric furnaces with different temperature settings; putting the powder mixture in a low-temperature oven; and then transferring it into a high-temperature oven in series.

Also, in case of sequential temperature rising of a large amount of powder mixture, a rotary kiln may be used. The rotary kiln is a tilted heating pipe having a mechanism to rotate around a central axis thereof. The temperature of the powder mixture introduced from the upper part of the heating pipe can be elevated in a process of moving to the lower part in the pipe. Therefore, by controlling temperature of the heating pipe and a moving speed of the powder mixture, it is possible to properly control the final temperature and temperature rising rate of the powder mixture.

Temperature rising procedure may be started from room temperature, or after preheating the powder mixture. Note that the preheating temperature of the powder mixture is less than 400° C. A temperature rising rate at preheating is not particularly limited, but it is preferable to elevate temperature at high-speed as above.

Grain growth of barium carbonate is known to occur by firing around 400 to 800° C. Since the temperature is rapidly raised in the temperature range of 400 to 700° C. in the present invention, time potentially consumed for grain growth of barium carbonate particle may be reduced. Therefore, by the temperature rising process having conditions defined in the present invention, grain growth of barium carbonate particle in the temperature rising process can be suppressed. Also, an amount of energy potentially consumed for grain growth of barium carbonate particle may be reduced, resulting in improvement of energy efficiency.

Following to the temperature rising process, the powder mixture is fired at 700° or more. At 700° C. or more, production of barium titanate by the solid phase reaction of barium carbonate particle and titanium oxide particle preferentially occurs before grain growth of barium carbonate particle. Since grain growth of barium carbonate particle hardly occurs in the firing process, barium carbonate particle and titanium oxide particle in fine particle forms react in a solid phase. Therefore, generation of barium titanate can be promoted, homogeneous barium titanate particle can be obtained, and also, barium titanate powder with small particle size can be obtained in the early phase of the firing process.

The maximum temperature at firing is 700° C. or more, preferably 700 to 1100° C. and further preferably 800 to 1000° C. Also, the firing time is sufficient time for solid phase reaction between barium carbonate particle and titanium oxide particle, and is generally 0.5 to 4 hours, preferably 0.5 to 2 hours. The firing atmosphere is not particularly limited, and may be air atmosphere or gas atmosphere such as nitrogen, or under reduced-pressure or in vacuum. When the firing temperature is too low or firing time is too short, it is liable to obtain no homogeneous barium titanate particle.

By such firing, barium titanate powder with small particle size can be obtained in the early phase of the firing process. This fine barium titanate particle may be subject to grain growth by continuing the firing. Therefore, according to the present invention, properly-set firing time allows easily obtaining barium titanate powder with a desired particle size.

The temperature rising rate to the above firing temperature following to the rapid temperature rising process at 400° C. to 700° C. is not particularly limited, and approximately 3 to 10° C./min is appropriate from a viewpoint of reducing load to the device. When firing at the maximum temperature of 700° C., the temperature may be held at 700° C. after the temperature rising process, and when firing at 800° C., the temperature may be raised to 700° C., followed by temperature rising at approximately 3 to 10° C./min.

After firing, the temperature is lowered to obtain barium titanate powder. The temperature falling rate is not particularly limited, and may be approximately 3 to 100° C./min from a viewpoint of safety, etc.

The obtained barium titanate powder is subject to pulverization if necessary, and then used as a material for producing a dielectric ceramics. When producing a dielectric ceramics, a variety of commonly-known methods can be used without any particular limitation. For example, subcomponents used for production of a dielectric ceramics can be properly selected depending on the target dielectric properties. Also, preparation of paste and green sheet, formation of an electrode layer, sintering of a green body may be properly performed in accordance with commonly-known methods.

Hereinafter, the present invention will be further described based on detailed examples, but the present invention is not limited to the examples.

Note that evaluations of various properties were done as below in the following examples and comparative examples.

Specific Surface Area

The specific surface areas of barium carbonate powder and titanium oxide powder, i.e. raw materials, and barium titanate powder obtained by firing were measured by a BET method.

X-Ray Diffraction

The barium titanate powder obtained by firing was subject to X-ray diffraction analysis, and intensity ratio ($BaCO_3$/$BaTiO_3$) of main peaks derived from barium carbonate and barium titanate (hereinafter which is referred to as "BC/BT ratio") was calculated. The higher BC/BT ratio indicates more residue of unreacted barium carbonate.

Variation in Particle Size

The barium titanate powder obtained by firing was subject to electron microscope observation. Particle sizes of 200 or more particles were measured to obtain an average and standard deviation thereof. Variation of the particle sizes (hereinafter which is referred to as "CV value") was evaluated by calculating "(standard deviation of particle sizes)/(average particle size)." The larger CV value indicates larger variation in particle sizes.

Examples 1 to 3 and Comparative Examples 1 to 4

Preparation of Powder Mixture

Barium carbonate powder with specific surface area of 26 $m^2$/g and titanium oxide powder with specific surface area of 31 $m^2$/g were wet-mixed with a ball mill using a zirconia ($ZrO_2$) media followed by drying, to obtain powder mixture.

[Firing of Powder Mixture]

Temperature of the powder mixture was increased from room temperature to 700° C. by an electric furnace (batch furnace) in air atmosphere at temperature rising rate shown in Table 1. Then, the temperature was increased to 850° C. at temperature rising rate of 3° C./min and held at the same temperature for 30 minutes, followed by temperature falling at 3° C./min. Results of evaluation of the obtained barium titanate powder are shown in Table 1.

TABLE 1

|  | Temp. rising rate | | | | barium titanate powder | | |
| --- | --- | --- | --- | --- | --- | --- | --- |
|  | RT to 700 °C./min | 700 or higher °C./min | Firing Temp. °C. | Firing time min | specific surface area $m^2$/g | BC/BT % | CV % |
| Comp. EX 1 | 3 | 3 | 850 | 30 | 15.1 | 5.3 | 40 |
| Comp. EX 2 | 15 | 3 | 850 | 30 | 14.6 | 2.8 | 37 |
| Comp. EX 3 | 30 | 3 | 850 | 30 | 16.5 | 1.7 | 35 |
| Comp. EX 4 | 60 | 3 | 850 | 30 | 17.2 | 0.5 | 31 |
| Example 1 | 100 | 3 | 850 | 30 | 18.5 | 0.1 | 28 |
| Example 2 | 150 | 3 | 850 | 30 | 18.7 | 0.1 | 22 |
| Example 3 | 200 | 3 | 850 | 30 | 18.6 | 0.1 | 23 |

Comp. EX = Comparative example;
RT = Room temperature;
BC/BT = Intensity ratio ($BaCO_3$/$BaTiO_3$) of main peaks;
CV = Variation of the particle sizes When the temperature was increased at a rate of less than 100° C./min in a temperature range of 400 to 700° C., unreacted barium carbonate remained, and the obtained barium titanate powder was large in particle size and low in homogeneity of particles (Comparative Examples 1 to 4). On the other hand, when the temperature was increased at a rate of 100° C./min or more in a temperature range of 400 to 700° C., there was no residue of unreacted barium carbonate, and the obtained barium titanate powder was small in particle size and high in particle homogeneity of particles (Examples 1 to 3).

What is claimed:

1. A production method of barium titanate comprising steps of preparing powder mixture of barium carbonate powder and titanium oxide powder and firing the powder mixture, wherein temperature of the powder mixture is raised to firing temperature at 150° C./minute or more in the range of 400° C. to 700° C.; and maximum temperature at firing is 700° C. or more.

2. The production method of barium titanate as set forth in claim 1, wherein Ba/Ti (molar ratio) in the powder mixture is 1.000 or more.

3. The production method of barium titanate as set forth in claim 1, wherein a specific surface area of said titanium oxide powder is 15 to 100 $m^2/g$ and a specific surface area of said barium carbonate powder is 10 to 50 $m^2/g$.

4. The production method of barium titanate as set forth in claim 2, wherein a specific surface area of said titanium oxide powder is 15 to 100 $m^2/g$ and a specific surface area of said barium carbonate powder is 10 to 50 $m^2/g$.

* * * * *